United States Patent
Konishi

(10) Patent No.: US 8,282,833 B2
(45) Date of Patent: Oct. 9, 2012

(54) RECOVERY METHOD AND RECOVERY APPARATUS OF THALLIUM IN CEMENT PRODUCTION FACILITIES

(75) Inventor: Masayoshi Konishi, Narashino (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 88 days.

(21) Appl. No.: 12/921,098

(22) PCT Filed: Mar. 6, 2009

(86) PCT No.: PCT/JP2009/054295
§ 371 (c)(1),
(2), (4) Date: Sep. 3, 2010

(87) PCT Pub. No.: WO2009/110594
PCT Pub. Date: Sep. 11, 2009

(65) Prior Publication Data
US 2011/0005350 A1  Jan. 13, 2011

(30) Foreign Application Priority Data
Mar. 7, 2008  (JP) ................................. 2008-057850

(51) Int. Cl.
*C02F 1/66* (2006.01)
(52) U.S. Cl. ........................................ 210/665; 266/147
(58) Field of Classification Search ................... 210/665
See application file for complete search history.

(56) References Cited

U.S. PATENT DOCUMENTS
2010/0000444 A1* 1/2010 Constantz et al. ............ 106/465
2010/0065502 A1* 3/2010 Konishi ........................ 210/665

FOREIGN PATENT DOCUMENTS
| EP | 1 955 980 | 8/2008 |
| JP | 3-503443 | 8/1991 |
| JP | 2006-347794 | 12/2006 |
| JP | 2007-117966 | 5/2007 |
| JP | 2007-130565 | 5/2007 |
| JP | 2007-268398 | 10/2007 |
| WO | WO 89/09253 | 10/1989 |
| WO | WO 2007/052618 | 10/2007 |

OTHER PUBLICATIONS

Espacenet Bibliographic data for WO 2007052618 A1, published May 10, 2007. http://worldwide.espacenet.com/publicationDetails/biblio?DB=worldwide.espacenet.com&II=0&ND=3&adjacent=true&locale=en_EP&FT=D&date=20070510&CC=WO&NR=2007052618A1&KC=A1 downloaded Jan. 20, 2012.*

* cited by examiner

*Primary Examiner* — George Wyszomierski
*Assistant Examiner* — Tima M McGuthry Banks
(74) *Attorney, Agent, or Firm* — Merchant & Gould P.C.

(57) ABSTRACT

A method for recovering thallium in a cement production facility according to the present invention includes: a collecting process of collecting dust from combustion gas at a passage of the combustion gas, which is downstream of a gas outlet of a suspension preheater or a gas outlet of a demineralizer of a cement kiln of the cement production facility; a water-cleaning process of producing slurry or a water solution by cleaning the collected dust using water; and a filtering process of separating the slurry or water solution into a solid and a liquid and recovering thallium, wherein thallium is recovered from the combustion gas exhausted from the cement production facility.

3 Claims, 2 Drawing Sheets

RECOVERY METHOD AND RECOVERY APPARATUS OF THALLIUM IN CEMENT PRODUCTION FACILITIES

TECHNICAL FIELD

This application is a National Stage Application of PCT/JP2009/054295, filed 6 Mar. 2009, which claims benefit of Serial No. 2008-057850, filed 7 Mar. 2008 in Japan and which applications are incorporated herein by reference. To the extent appropriate, a claim of priority is made to each of the above disclosed applications.

The present invention relates to an apparatus and method for recovering thallium in a cement production facility, and more particularly, to an apparatus and method for recovering thallium in a cement production facility, which can recover high-purity thallium (Tl), i.e., one of the useful metals included in combustion gas exhausted from cement production facilities.

BACKGROUND ART

In response to recent increased interest in global environmental preservation, industrial waste is being effectively utilized, even in cement production facilities.

Since such industrial waste includes volatile components such as chlorine, a demineralizer or the like is required to remove the chlorine. The demineralizer is an apparatus that removes volatile components, such as condensed chlorine, by repeating processes of volatilization and condensation between a cement kiln and a preheater. In detail, chlorine bypass dust is generated by solidification of volatile components, the majority of which are chlorine compounds, by extracting exhaust gas from the kiln end part of the cement kiln and cooling the extracted exhaust gas. Afterwards, the chlorine bypass dust is exhausted out of the system, thereby removing chlorine from the cement kiln.

However, since the chlorine bypass dust produced from the demineralizer includes thallium, which is a useful metal, it is preferable to recover and reuse this thallium.

Therefore, proposed is a method for recovering metals, such as thallium, lead, selenium, and the like, from a cement production process by extracting a portion of cement kiln combustion gas having a temperature ranging from 300 to 900° C. from the cement production process, and collecting dust included in the extracted combustion gas by cooling the extracted combustion gas without removing dust from the same (Patent Document 1). In addition, proposed is a method for extracting exhaust gas having a temperature ranging from 200 to 800° C. from a preheater of a cement production facility and recovering useful metals, such as thallium, lead, cadmium, zinc, mercury, and the like, from the exhaust gas (Patent Document 2).

[Patent Document 1] Japanese Unexamined Patent Application Publication No. 2006-347794
[Patent Document 2] Japanese Unexamined Patent Application Publication No. 2007-130565

DISCLOSURE OF THE INVENTION

Problem that the Invention is to Solve

However, although the method for recovering useful metals of the related art can ensure the recovery of thallium, the recovered thallium includes a large amount of useful metals, such as lead, selenium, cadmium, zinc, mercury, and the like. Therefore, it is necessary to refine the recovered thallium again in order to produce high-purity thallium. This, consequently, causes problems in which the number of processes and the expense incurred in the recovery of thallium are increased.

The present invention has been made to solve the foregoing problems and has an object of providing an apparatus and method for recovering thallium in a cement production facility, which can recover high-purity thallium, which is one of the useful metals included in combustion gas exhausted from the cement production facility, without refining it again, and incurs low costs in the recovery of thallium.

Means for Solving the Problem

In order to solve the forgoing problem, the present invention provides a method and apparatus for recovering thallium in a cement production facility as follows.

That is, the method for recovering thallium in a cement production facility according to the invention includes
a collecting process of collecting dust from combustion gas at a passage of the combustion gas, which is downstream of a gas outlet of a suspension preheater or a gas outlet of a demineralizer of a cement kiln of the cement production facility,
a water-cleaning process of producing slurry or a water solution by cleaning the collected dust using water, and
a filtering process of separating the slurry or water solution into a solid and a liquid and recovering thallium,
so that thallium is recovered from the combustion gas exhausted from the cement production facility.

In the method for recovering thallium, the dust included in the combustion gas is collected at the passage of the combustion gas, which is downstream of the gas outlet of the suspension preheater or the gas outlet of the demineralizer of the cement kiln of the cement production facility, the collected dust is converted into the slurry or water solution by cleaning it using water, and the slurry or water solution is separated into a solid and a liquid.

Thereby, thallium resides at a high purity in a separated and filtered solution, and high-purity thallium can be easily produced. Meanwhile, the separated solid is effectively utilized as a cement raw material of the cement production facility.

In addition, since the temperature of the combustion gas downstream of the gas outlet of the suspension preheater or the gas outlet of the demineralizer of the cement kiln of the cement production facility is lower than that of combustion gas extracted from the suspension preheater, it is not necessary to cool this combustion gas using an additional cooling means and high-purity thallium is efficiently produced.

In the water-cleaning process, it is preferable that the dust be cleaned using a strong alkaline water solution, which is produced by adding sodium hydroxide and/or potassium hydroxide into water.

In the method for recovering thallium, since the dust is cleaned using the strong alkaline water solution, which is produced by adding sodium hydroxide and/or potassium hydroxide into water, thallium included in the dust is easily eluted by the strong alkaline water solution and the slurry or water solution having high thallium concentration is easily produced.

It is preferable that the invention further include a reactive precipitation process of allowing a direct electrical current through the filtered solution, so that thallium ions dissolved in the filtered solution precipitate as thallium oxide, and separating the thallium oxide from the filtered solution.

In the method for recovering thallium, the thallium ions dissolved in the filtered solution are deposited as the thallium oxide and the thallium oxide is separated from the filtered solution by allowing a direct electrical current through the filtered solution. Thereby, thallium in the filtered solution, which would otherwise be difficult to deposit through pH adjustment or input of a reducing agent of the related art, can precipitate in the form of thallium oxide along with electrolysis of water and the resultant precipitation can be separated. As a result, thallium is easily removed from the filtered solution, and the purity of precipitated thallium oxide is raised.

The apparatus for recovering thallium in a cement production facility according to the invention includes a collecting means for collecting dust from combustion gas at a passage of the combustion gas, which is downstream of a gas outlet of a suspension preheater or a gas outlet of a demineralizer of a cement kiln of the cement production facility, a water-cleaning means for producing slurry or a water solution by cleaning the collected dust using water, and a solid-liquid separating means for separating the slurry or water solution into a solid and a liquid and separating thallium from the slurry or water solution, so that thallium is recovered from the combustion gas exhausted from the cement production facility.

In the apparatus for recovering thallium, the collecting means collects the dust included in the combustion gas at the passage of the combustion gas, which is downstream of the gas outlet of the suspension preheater or the gas outlet of the demineralizer of the cement kiln of the cement production facility, the water-cleaning means converts the collected dust into the slurry or water solution by cleaning it using water, and the solid-liquid separating means separates the slurry or water solution into solid and liquid, and separates thallium from the slurry or water solution.

Thereby, thallium resides at a high purity in a separated filtered solution, and high-purity thallium can be easily produced. Meanwhile, the separated solid is effectively utilized as a cement raw material of the cement production facility.

It is preferable that the collecting means include one or more selected from the group consisting of a moisture-adjusting column, which condenses and collects the dust included in the combustion gas by humidifying the combustion gas, an electrical precipitator, which absorbs the dust included in the combustion gas by electrification, and a bag filter, which collects the dust included in the combustion gas using a filter.

In the apparatus for recovering thallium, since the collecting means is constituted of one or more selected from the group consisting of the moisture-adjusting column, which condenses and collects the dust included in the combustion gas by humidifying the combustion gas, the electrical precipitator, which absorbs the dust included in the combustion gas by electrification, and the bag filter, which collects the dust included in the combustion gas using a filter, it is possible to efficiently collect the dust in the combustion gas exhausted from the cement production facility. As a result, the efficiency of collecting the dust is improved.

It is preferable that the invention further include a thallium separating means for allowing a direct electrical current through the filtered solution produced by the solid-liquid separating means, so that thallium ions dissolved in the filtered solution precipitate as thallium oxide, and separating the thallium oxide from the filtered solution.

In the apparatus for recovering thallium, the thallium separating means precipitates the thallium ions dissolved in the filtered solution as the thallium oxide and separates the thallium oxide from the filtered solution by allowing a direct electrical current through the filtered solution. Thereby, thallium, which would otherwise be difficult to deposit through pH adjustment or input of a reducing agent of the related art, can be easily removed from the filtered solution, and high-purity thallium oxide is easily produced.

Advantage of the Invention

The method for recovering thallium in a cement production facility according to the invention includes the collecting process of collecting dust from combustion gas at the passage of the combustion gas, which is downstream of the gas outlet of the suspension preheater or the gas outlet of the demineralizer of the cement kiln of the cement production facility, the water-cleaning process of producing slurry or a water solution by cleaning the collected dust using water, and the filtering process of separating the slurry or water solution into a solid and a liquid. Thereby, high-purity thallium can be easily produced at a low cost. In addition, the separated solid can be effectively utilized as a cement raw material of the cement production facility, thereby contributing to a reduction in the producing costs of the cement production facility.

The apparatus for recovering thallium in a cement production facility according to the invention includes the collecting means for collecting dust from combustion gas at the passage of the combustion gas, which is downstream of the gas outlet of the suspension preheater or the gas outlet of the demineralizer of the cement kiln of the cement production facility, the water-cleaning means for producing slurry or a water solution by cleaning the collected dust using water, and the solid-liquid separating means for separating the slurry or water solution into a solid and a liquid. Thereby, high-purity thallium can be easily produced at a low cost. In addition, the separated solid can be effectively utilized as a cement raw material of the cement production facility, thereby contributing to a reduction in the producing costs of the cement production facility.

DESCRIPTION OF REFERENCE NUMERALS

Figure 1:
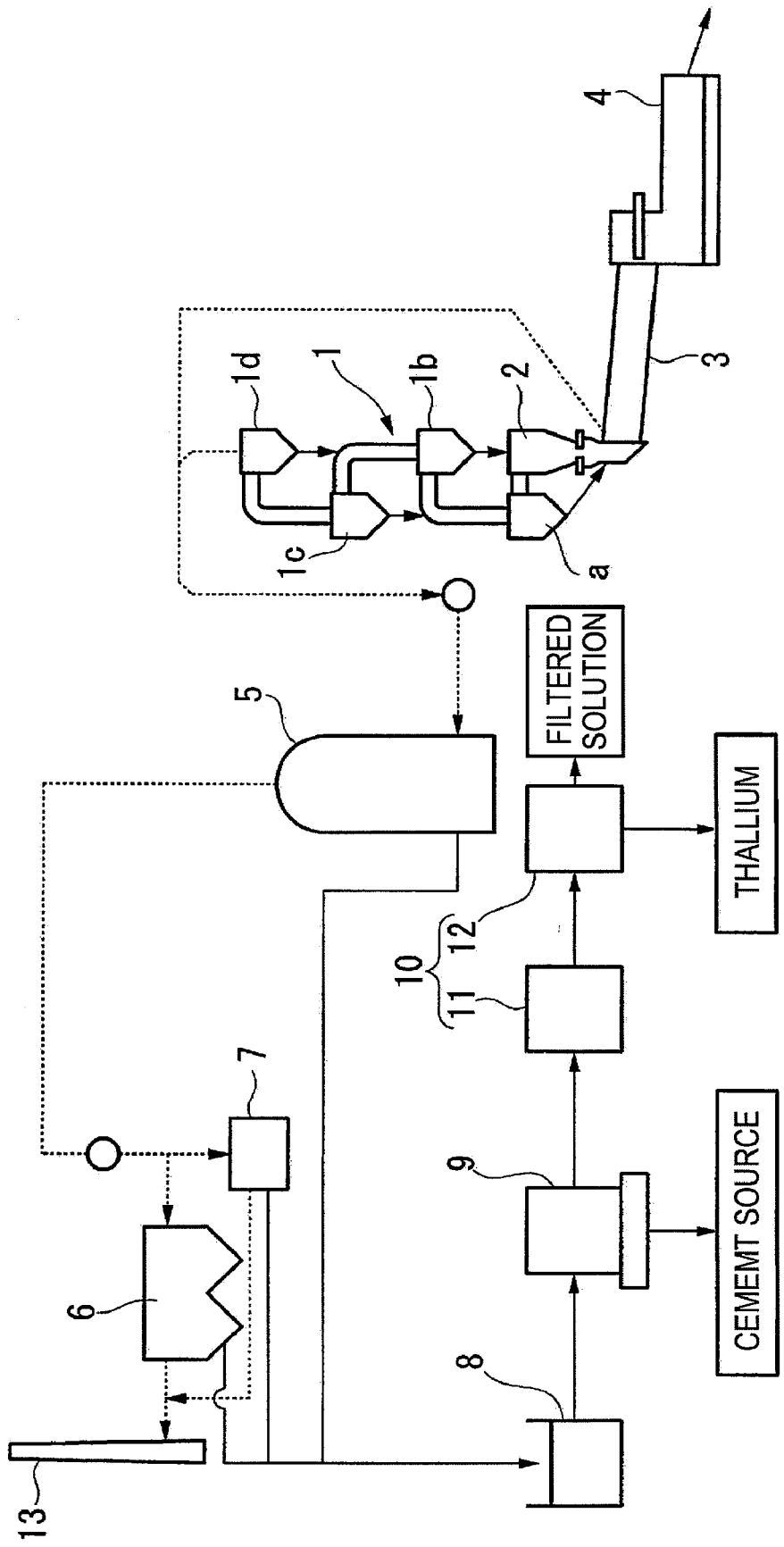
FIG. 1 is a schematic view showing a cement production facility equipped with an apparatus for recovering thallium according to an exemplary embodiment of the invention.

1: suspension preheater
1a to 1d: cyclone
2: prefurnace
3: cement kiln
4: clinker cooler
5: stabilizer
6: electrical precipitator (EP)
7: bag filter
8: water cleaning bath
9: filtration apparatus
10: apparatus for separating thallium
11: reactive precipitation bath
12: thallium separator
13: chimney

BEST MODE FOR CARRYING OUT THE INVENTION

Preferred embodiments of an apparatus and method for recovering thallium in a cement production facility according to the invention will be described with reference to the drawings.

In addition, the embodiments of the invention are described in detail for a better understanding of the technical spirit of the invention, but the invention is not limited to the embodiments unless particularly specified.

FIG. 1 is a schematic view showing a cement production facility equipped with an apparatus for recovering thallium according to an exemplary embodiment of the invention. Shown is an example in which the apparatus, which recovers thallium (Tl) included in combustion gas exhausted from the cement production facility and effectively utilizes a calcium component included in this combustion gas as a cement raw material, is installed.

Referring to FIG. 1, reference numeral 1 indicates a suspension preheater including multi-stage cyclones 1a to 1d, 2 indicates a calcining furnace, 3 indicates a cement kiln, 4 indicates a clinker cooler, 5 indicates a stabilizer (i.e., a moisture-adjusting column), 6 indicates an Electrical Precipitator (EP), 7 indicates a bag filter, 8 indicates a water cleaning bath (water cleaning means), 9 indicates a filtration apparatus (solid-liquid separating means), 10 indicates a thallium separating apparatus (thallium separating means), which includes a reactive precipitation bath 11 and a thallium separator 12, and 13 indicates a chimney.

The stabilizer 5, the electrical precipitator 6, the bag filter 7, the water cleaning bath 8, the filtration apparatus 9, and the thallium separating apparatus 10 constitute the apparatus for recovering thallium according to this exemplary embodiment.

The stabilizer 5 is an apparatus, in which an inlet and an outlet of combustion gas are installed on a hollow column and a water spraying device (not shown) is installed inside the column. At least one or both of combustion gas, exhausted from the uppermost cyclone 1d downstream of the suspension preheater 1, and combustion gas, exhausted from a dechlorination bypass apparatus (not shown), which is installed on the kiln end part of the cement kiln 3 to extract chlorine therefrom, is introduced into the column. Inside the column, the introduced exhaust gas is humidified and cooled by spraying water. Dust in the combustion gas condenses in response to the humidification and cooling, sinks to the bottom of the column, and is then collected. The combustion gas has an inlet temperature from 200 to 450° C. and an outlet temperature from 120 to 200° C.

The electrical precipitator 6 is an apparatus that collects the dust in the introduced combustion gas by charging the combustion gas through electric discharge using a negative pole line, introducing the combustion gas between a pair of positive pole plates, and adsorbing the charged dust on the positive pole plates. The temperature of the introduced combustion gas generally ranges from 85 to 180° C.

The bag filter 7 is an apparatus that collects the dust in the combustion gas by introducing the combustion gas into a pocket-like filter made of porous nonwoven cloth, such that the combustion gas passes through the filter. The temperature of the introduced combustion gas generally ranges from 85 to 150° C.

The water cleaning bath 8 is an apparatus that produces slurry (or a water solution) by cleaning the dust, which is collected by at least one or two or more selected from among the stabilizer 5, the electrical precipitator 6, and the bag filter 7, by water. Specifically, the water cleaning bath 8 is an apparatus that stores fresh water (hereinafter, referred to as freshwater), which is poured thereinto, and produces slurry (or a water solution) by inputting the dust into the fresh water, followed by water cleaning through immersion and stirring, so that water soluble components, including the thallium ions in the dust are eluted into the water.

The water cleaning bath 8 can use secondary water instead of fresh water, which is discharged from the cement production facility.

The filtration apparatus 9 is an apparatus that separates the slurry (or the water solution) including thallium ions, discharged from the water cleaning bath 8, into cakes (solid), which include a calcium component, and a filtered solution, which includes the thallium ions, using a filter. The filtration apparatus 9 can be, for example, a press filter. The cakes, including the calcium component, are effectively utilized as a cement raw material.

The reactive precipitation bath 11 is an apparatus that deposits the thallium ions dissolved in the filtered solution as thallium oxide by allowing a direct electrical current to flow through the filtered solution including the thallium ions, discharged from the filtration apparatus 9.

The thallium separator 12 is an apparatus that separates the filtered solution, which is discharged from the reactive precipitation bath 11 and in which thallium oxide is deposited, into sludge in the form of cakes, including thallium oxide, and a filtered solution. Examples of the thallium separator 12 may include a cross-flow type precision filter apparatus and a centrifugal separator or the like.

The filtered solution, discharged from the thallium separator 12, may include a small amount of metals dissolved therein. In this case, it is preferable that the metals dissolved in the filtered solution be removed using an ion-exchange resin.

Below, a description will be given of a method for recovering thallium of this embodiment with reference to FIG. 1.

The method for recovering thallium of this embodiment is a method for recovering thallium included in combustion gas, exhausted from the uppermost cyclone 1d of the suspension preheater 1 of the cement production facility, or combustion gas, exhausted from the dechlorination bypass apparatus (not shown), which is installed on the kiln end part of the cement kiln 3 to extract chlorine therefrom. Specifically, the method includes collecting dust included in the combustion gas, producing slurry or a water solution by cleaning the collected dust by water, separating the slurry or the water solution into a solid and a liquid, and recovering thallium.

The respective processes will be described in more detail.

[Dust Collection Process]

Dust, which is collected by introducing combustion gas discharged from the uppermost cyclone 1d of the suspension preheater 1 of the cement production facility into at least one or two or more of the stabilizer 5, the electrical precipitator 6, and the bag filter 7, is used.

[Water Cleaning Process]

Slurry (or a water solution) is produced by pouring and storing, in the water-cleaning bath 8, a certain amount of fresh water, for example, freshwater in an amount that is 2 to 4 times by weight of the amount of the dust to be cleaned by water, and inputting a certain amount of dust into the fresh water, followed by water cleaning through immersion and stirring, so that water soluble components including thallium ions in the dust are eluted into the water.

The reason why the amount of the poured fresh water is limited as above is as follows: If the amount of the poured water is 2 times by weight of the dust or less, the water soluble components, including thallium ions, in the dust tend to insufficiently elute. This, as a result, increases the residual water soluble components, including thallium ions, in cakes produced through filtering by the subsequent filtration apparatus 9. In addition, due to an increase in the viscosity of the slurry (or the water solution) that is produced, it becomes difficult to pump the slurry to subsequent processes.

In addition, if the amount of the poured water is 4 times by weight or more of the dust, greater amounts of components other than thallium ions, such as calcium components or heavy metals, are eluted. This results in an increase in the dosage of chemicals in order to remove these components in subsequent processes.

In this water-cleaning process, the temperature inside the water-cleaning bath 8 can be raised to 40° C. or more in order to increase the rate of dissolution of the water soluble components including thallium ions. In addition, the stirring time is preferably 1 hour or less. Within this stirring time, the water soluble components including thallium ions can be sufficiently eluted. Stirring for a long time is not preferable, since salts, including calcium or the like, which is contained in the dust, may occur, thereby forming precipitation.

In this water-cleaning process, the amount of elution of thallium, contained in the dust, can be maximized using a strong alkaline water solution, which is produced by dissolving sodium hydroxide (NaOH) and/or potassium hydroxide (KOH) into water.

In this case, the hydrogen ion concentration (pH) of a sodium hydroxide water solution or a potassium hydroxide water solution preferably ranges from 13 to 14.

[Filtering Process]

Slurry (or a water solution), including thallium ions, discharged from the water-cleaning bath 8 is introduced into the filtration apparatus 9, and is separated into cakes (solid) including calcium components and a filtered solution including thallium ions by a filter.

In this separation, water soluble components, including thallium ions residing in the cakes inside the filtration apparatus 9, are preferably cleaned using fresh water. This cleaning, using the fresh water, can be efficiently performed using a small amount of water by forcing fresh water into the cakes in one direction in the state in which the filtration apparatus 9 is pressed.

The fresh water used in the cleaning is preferably used in an amount ranging from 0.5 to 2.0 times by weight with respect to the amount of the dust to be cleaned.

Due to the cleaning using fresh water, it is possible to sufficiently remove the water soluble components including thallium ions, residing in the cakes.

In addition, the produced cakes are supplied directly to a cement production facility, starting from those having lower moisture content, and are mixed with other cement raw materials. The mixture is dried and pulverized, and is then recycled in a cement calcination process for reuse as a cement powder raw material and calcined to form cement clinkers.

[Reactive Precipitation Process]

The filtered solution including thallium ions, discharged from the filtration apparatus 9, is input into the reactive precipitation bath 11. An electrical current is applied to the filtered solution via electrodes, so that a portion of water in the filtered solution is electrically decomposed. Thereby, dissolved thallium ions are deposited as thallium oxide, which is then converted into a fine suspended material.

In this electrical decomposition, metals such as lead, copper, and zinc, are removed from the filtered solution by being deposited on the electrode. The deposited metals such as lead are separately and periodically recovered from the positive electrode.

[Thallium Separation Process]

The filtered solution in the form of a suspended solution, in which thallium oxide is deposited, discharged from the reactive precipitation bath 11 is introduced into the thallium separator 12, which presses and dewaters the filtered solution, so that the filtered solution is separated into sludge in the form of cakes including thallium oxide and a filtered solution. The filtered solution is sent to the reactive precipitation bath 11, so that it is recycled.

Thallium oxide produced as above can ensure purity of 90% or more. Therefore, it is possible to easily produce thallium in the form of high-purity thallium oxide.

In addition, the filtered solution in the form of a suspended solution, in which the thallium oxide is deposited, has very fine particulates, which are very difficult to precipitate. However, it is possible to deposit and separate the particulates by leaving them to stand.

As described above, the method for recovering thallium of this embodiment is a method for recovering thallium included in combustion gas, exhausted from the uppermost cyclone 1d of the suspension preheater 1, or combustion gas, exhausted from the dechlorination bypass apparatus (not shown), which is installed on the kiln end part of the cement kiln 3 to extract chlorine therefrom. Specifically, the method includes collecting dust included in the combustion gas downstream of the gas outlet of the suspension preheater or the gas outlet of the demineralizer of the cement kiln, producing slurry or a water solution by cleaning the collected dust by water, separating the slurry or the water solution into a solid and a liquid, and recovering thallium. Therefore, it is possible to produce high-purity thallium easily or at a low cost. In addition, the separated solid can be effectively utilized as a cement raw material of the cement production facility and thus contribute to a reduction in the producing of the cement production facility.

The apparatus for recovering thallium of this embodiment includes the stabilizer 5, the electrical precipitator 6, and the bag filter 7, which collect dust from combustion gas at a passage of the combustion gas, which is downstream of the gas outlet of the suspension preheater or the gas outlet of the demineralizer of the cement kiln of the cement production facility, the water-cleaning bath 8, which produces slurry or a water solution by cleaning the dust by water, a filtration apparatus 9, which separates the slurry or the water solution produced by the water-cleaning means into a solid and a liquid, and the reactive precipitation bath 11, which allows a direct electrical current to flow through a filtered solution including thallium ions, so that thallium ions dissolved in the filtered solution are deposited as thallium oxide. Therefore, it is possible to easily produce high-purity thallium at a low cost. In addition, the separated solid can be effectively utilized as a cement raw material of the cement production facility, thereby contributing to a reduction in the producing costs of the cement production facility.

EXAMPLE

Below, a detailed description will be given of the Example of the method for recovering thallium in a cement production facility of the invention. However, the invention is not limited to the following Example as long as it does not depart from the scope of the invention.

In this Example, three types of dust were used, which include stabi-dust collected by the stabilizer 5 from combustion gas exhausted from the uppermost cyclone 1d of the suspension preheater 1 of the cement production facility, EP dust collected by the electrical precipitator 6 from the same combustion gas, and bag dust collected by the bag filter 7 from the same combustion gas.

Contents of thallium (Tl) in these dusts are presented in Table 1.

In addition, the stabi-dust refers to dust collected in a stabilizer (i.e., a moisture-adjusting column).

TABLE 1

| | Content of thallium (mg/kg) |
|---|---|
| Stabi-dust | 500 |
| EP dust | 1300 |
| Bag dust | 2200 |

In general, the dust in the combustion gas includes thallium of, approximately, several hundred to several thousand ppm, which is attached to more minute particles. Referring to the thallium contents of the dusts according to the collecting places, the thallium content of the stabi-dust is 500 mg/kg, the thallium content of the EP dust is 1300 mg/kg, and the thallium content of the bag dust is 2200 mg/kg. It can be appreciated that the concentration increases toward the downstream of the cement production process.

Consequently, three types of slurries were prepared by mixing the dusts with fresh water such that the ratio of dust to freshwater is 1:10 by mass. Respective slurry was separated into cakes (solid) and a filtered solution including thallium ions. The concentrations of thallium in the filtered solutions are presented in Table 2.

TABLE 2

| | Concentration of thallium (mg/L) |
|---|---|
| Stabi-dust | 40 |
| EP dust | 90 |
| Bag dust | 150 |

Referring to this table, the bag dust is most preferable. The bag dust is preferable in the removal and recovery of thallium, since thallium concentration is high, dust collecting efficiency is good, and it is exhausted in a small amount from combustion gas and generates a small amount of dust.

In addition, the EP dust was cleaned using potassium hydroxide (KOH) solutions having two types of pH as cleaning solutions. The concentration of thallium in the resultant slurry was measured, and compared with the concentration of thallium in the slurry when the EP dust was cleaned using fresh water (pH not adjusted).

Figure 2:
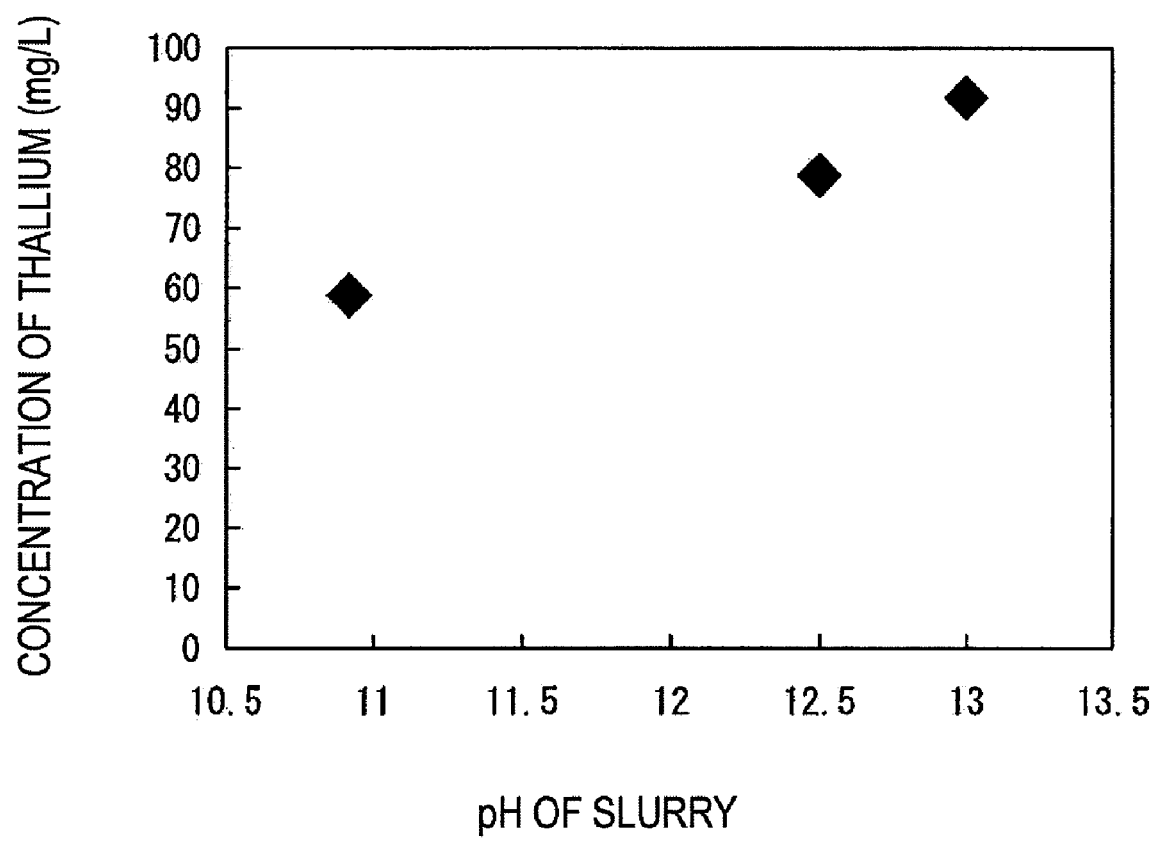
FIG. 2 is a view showing the relationship between the pH of slurry and the concentration of thallium.

Measured results are presented in Table 3 and FIG. 2.

TABLE 3

| | pH of slurry | Concentration of thallium (mg/L) |
|---|---|---|
| Only fresh water (pH not adjusted) | 10.9 | 59 |

TABLE 3-continued

| | pH of slurry | Concentration of thallium (mg/L) |
|---|---|---|
| Adjusted in KOH | 12.5 | 79 |
| Adjusted in KOH | 13 | 92 |

Referring to Table 3 and FIG. 2, it was found that the amount of elution of thallium included in dust, which is the concentration of thallium in slurry, can be maximized using a strong alkaline water solution.

In addition, it was observed that thallium recovered in this way was thallium oxide ($Tl_2O_3$) having good crystallinity as the result of powder X ray diffraction. Furthermore, thallium was confirmed to be high-purity thallium oxide ($Tl_2O_3$), in which no diffraction rays other than thallium oxide ($Tl_2O_3$) were recognized.

The invention claimed is:

1. An apparatus for recovering thallium in a cement production facility, comprising:
a collecting means for collecting dust from combustion gas at a passage of the combustion gas, which is downstream of a gas outlet of a suspension preheater or a gas outlet of a demineralizer of a cement kiln of the cement production facility,
a cleaning means for producing slurry or a water solution by cleaning the collected dust using a strong alkaline water solution which is produced by adding sodium hydroxide and/or potassium hydroxide into water, and
a solid-liquid separating means for separating the slurry or water solution into a solid and a liquid and separating thallium from the slurry or water solution produced by the water-cleaning means,
wherein thallium is recovered from the combustion gas exhausted from the cement production facility.

2. The apparatus for recovering thallium in a cement production facility according to claim 1, wherein the collecting means includes one or more selected from the group consisting of a moisture-adjusting column, which condenses and collects the dust included in the combustion gas by humidifying the combustion gas, an electrical precipitator, which absorbs the dust included in the combustion gas by electrification, and a bag filter, which collects the dust included in the combustion gas using a filter.

3. The apparatus for recovering thallium in a cement production facility according to claim 1, further comprising a thallium separating means for allowing a direct electrical current through the filtered solution produced by the solid-liquid separating means, so that thallium ions dissolved in the filtered solution precipitate as thallium oxide, and separating the thallium oxide from the filtered solution.

* * * * *